United States Patent [19]

Howng

[11] Patent Number: 4,647,895

[45] Date of Patent: Mar. 3, 1987

[54] CERAMIC TEMPERATURE SENSOR

[75] Inventor: Wei-Yean Howng, Albuquerque, N. Mex.

[73] Assignee: Motorola, Inc., Schaumburg, Ill.

[21] Appl. No.: 732,358

[22] Filed: May 8, 1985

[51] Int. Cl.[4] .......................... H01G 7/10; H01B 1/06

[52] U.S. Cl. .................................... 338/22 R; 338/25; 252/520; 252/521

[58] Field of Search ................. 338/22 R, 25, 28, 308, 338/314, 330; 252/521, 520; 324/65 R; 340/601; 501/126, 127, 134, 135

[56] References Cited

U.S. PATENT DOCUMENTS

| | | | |
|---|---|---|---|
| 4,013,592 | 3/1977 | Matsuoka et al. | 338/22 R |
| 4,015,230 | 3/1977 | Nitta et al. | 338/35 |
| 4,050,052 | 9/1977 | Reichelt et al. | 338/314 |
| 4,080,564 | 3/1978 | Nitta et al. | 324/65 R |
| 4,162,631 | 7/1979 | Logothetis et al. | 73/362 AR |
| 4,231,254 | 11/1980 | Logothetis et al. | 73/362 AR |
| 4,328,478 | 5/1982 | Murata et al. | 338/35 |

FOREIGN PATENT DOCUMENTS

| | | | |
|---|---|---|---|
| 2429866 | 1/1975 | Fed. Rep. of Germany | 338/22 R |
| 2605804 | 9/1976 | Fed. Rep. of Germany | 338/22 R |
| 2838508 | 3/1980 | Fed. Rep. of Germany | 338/22 R |
| 0107696 | 9/1978 | Japan | 338/22 R |
| 0138096 | 12/1978 | Japan | 338/22 R |
| 0013409 | 4/1980 | Japan | 338/22 R |
| 0151301 | 11/1980 | Japan | 338/25 |
| 0151302 | 11/1980 | Japan | 338/25 |
| 0066745 | 6/1981 | Japan . | |
| 0083901 | 7/1981 | Japan | 338/35 |
| 0010203 | 1/1982 | Japan . | |
| 0575718 | 10/1977 | U.S.S.R. | 338/22 R |
| 0995130 | 2/1983 | U.S.S.R. | 338/25 |

OTHER PUBLICATIONS

Carlson, John R., "Thermistors for Overcurrent Protection", *Machine Design*, vol. 53, No. 28, Dec. 10, 1981, pp. 161-165.

*Primary Examiner*—E. A. Goldberg
*Assistant Examiner*—Linda M. Peco
*Attorney, Agent, or Firm*—Charles L. Warren; Donald B. Southard

[57] ABSTRACT

A device for monitoring temperature as a function of electrical resistivity comprises a sensing element formed of a ceramic including lanthanum chromite with a dopant selected from magnesium oxide, aluminum oxide, titanium oxide and silicon oxide, and having electrodes operably affixed to the surface thereof.

23 Claims, 5 Drawing Figures

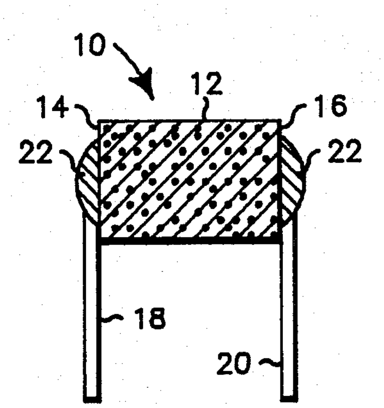
Fig. 1a
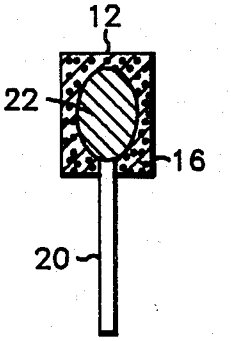
Fig. 1b
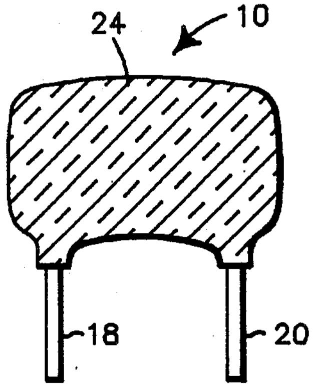
Fig. 1c
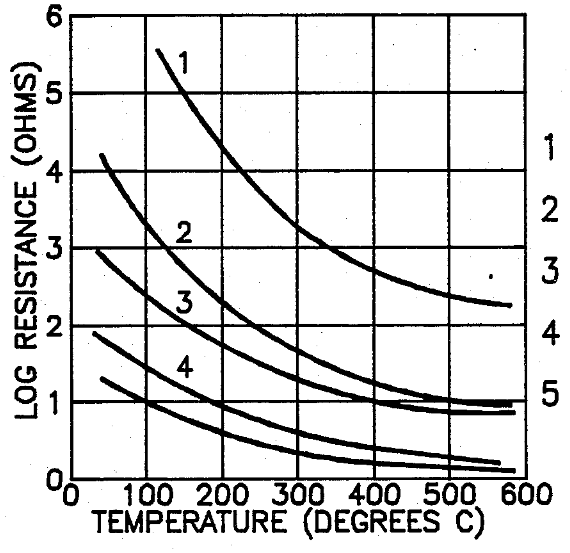
Fig. 2
1 $LaCr_{0.90}Ti_{0.10}O_3 \cdot 0.02\ SiO_2$
2 $LaCr_{0.97}Ti_{0.03}O_3$
3 $LaCrO_3$
4 $LaCr_{0.925}Mg_{0.50}Al_{0.25}O_3$
5 $LaCr_{0.95}Mg_{0.50}O_3$
Fig. 3
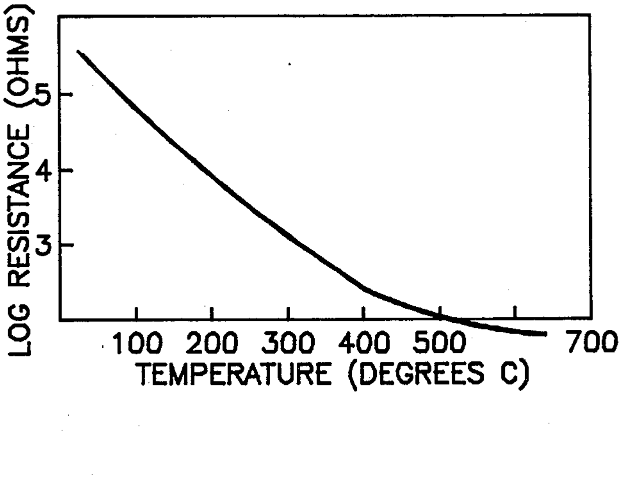

CERAMIC TEMPERATURE SENSOR

TECHNICAL FIELD

The present invention relates to a device for monitoring temperature and, in particular, to a device comprising a temperature sensing element formed of a ceramic having electrodes secured to the surface thereof.

BACKGROUND OF THE INVENTION

Ceramic resistive-type temperature sensors have been used widely for low cost temperature sensing. The operating temperature range of the temperature sensors currently available, however, is very limited. Conventional ceramic temperature sensors operate at temperatures less than 400° C. In certain applications, for example in self-cleaning cooking ranges, the required operating temperature can range as high as 600° C.

Several general types of temperature sensors have been disclosed in the prior art.

For example, Japanese Application No. J53-138096 discloses a thermistor comprising a solid solution of magnesium, aluminum, chromium and iron oxides as a principal component and oxides or carbonates of nickel, cobalt, zinc, titanium, barium and lanthanum as additives. A preferred composition includes $Mg(Al_xCr_yFe_z)_2O_4$ as the solid solution wherein $x+y+z=1$. Additives including $La_2O_3$ and $TiO_2$ may also be present.

Japanese Application No. J53-107696 discloses a thermistor comprising a sintered mixture prepared from the following materials: $La_2O_3$, $CrO_3$, SnO, $TiO_2$, $Cu_2O$, $CaCO_3$, $Bi_2O_3$, $NaHCO_3$, $SiO_2$ and $Al_2O_3$. The principal components of the mixture include lanthanum, chromium and tin. Each component of the mixture, however, is used as a base material; a dopant is not used.

Russian Pat. No. SU-995130 discloses a thermoresistive material containing lanthanum oxide ($La_2O_3$), aluminum oxide ($Al_2O_3$), and an additive selected from: (1) chromium oxide, copper oxide or vanadium oxide; (2) a mixture of chromium and copper oxides; or (3) a mixture of chromium, copper and vanadium oxides. One composition is a lanthanum aluminate, with chromium being present only as a dopant at a concentration of two percent.

German Application No. 2,605,804 discloses thermistor compositions as sintered mixtures of magnesium aluminate, magnesium chromate and lanthanum chromite. As illustrated in a phase diagram (FIG. 2) of that publication, a composition containing primarily lanthanum chromite is outside the scope of the compositions disclosed in that publication.

Platinum-based resistive sensors, however, are the only currently available means for sensing temperatures up to 600° C. Such devices are relatively expensive and have a low sensitivity. In order to reduce the cost of the sensor and to enhance the sensitivity, a medium temperature range, electrical resistive ceramic sensor is needed.

SUMMARY OF THE INVENTION

The present invention contemplates a device for monitoring temperatures of up to 800 degrees Centigrade (C). A preferred embodiment of the device comprises a sensing element that is in electrical communication with a pair of conductive lead wires.

In particular, the sensing element is comprised of a ceramic having electrodes operably affixed to opposing, generally planar surfaces thereof. The ceramic is formed of lanthanum chromite and can include metal oxide dopants such as $TiO_2$, $Al_2O_3$, MgO and $SiO_2$. In particular, the ceramic can be represented by the chemical formula $$LaCr_{(1-x)}Me_xSi_yO_3$$

wherein

Me=Ti, Al or Mg $0<x\leqq 0.2$ $0\leqq y\leqq 0$ 2.

The resistivity of the ceramic and the sensing element formed therefrom decreases as the temperature increases. In particular, the resistivity varies on a logarithmic basis relative to changes in temperature depending on the stoichiometric ratio of the elements in the composition and the particular dopant or dopants selected.

As a general matter, the resistivity (expressed in ohm-centimeters) of a device may be calculated from the measured resistance (ohms) and the geometrical dimensions of the device.

The electrodes of the sensing element can be formed from a material selected from the group consisting of silver (Ag), gold (Au), silver-palladium (Ag-Pd) alloys, nickel-phosphorous (Ni-P) alloys, platinum (Pt), ruthenium oxide ($RuO_2$), nickel oxide (NiO), tin oxide ($SnO_2$), indium oxide ($In_2O_3$), cadmium oxide (CdO), titanium oxide ($TiO_2$), zinc oxide (ZnO), barium titanate ($BaTiO_3$) and barium plumbate ($BaPbO_3$).

Preferably, the electrodes are formed from silver (Ag), silver-palladium (Ag-Pd) alloys or platinum (Pt).

Accordingly, a benefit of this invention is the provision of a temperature-sensitive ceramic that can respond in a predictable manner to a change in ambient temperature conditions. The resistivity of the ceramic changes on a logarithmic basis relative to variations in temperature depending on the composition of the ceramic. In addition, the device responds well at lower resistivity values, and thus can be used to monitor temperature at relatively high temperature ranges.

An advantage of this invention is the provision a temperature-sensing device that responds in a reproducible manner to a broader range of temperatures than currently available devices; for example, from room temperature to about 800 degrees C. The ceramic that forms the sensing element of the device is also less expensive to produce and exhibits a better temperature coefficient than sensor elements that are now available.

These and other benefits and advantages of this invention will better be understood from the following detailed description and the accompanying drawings.

BRIEF DESCRIPTION OF THE DRAWINGS

In the drawings, which constitute a portion of this disclosure:

FIG. 1A is a side elevational view of one embodiment of the device of this invention;

FIG. 1B is an end view of the embodiment shown in FIG. 1A;

FIG. 1C is a side elevational view of the embodiment of FIG. 1A coated with a temperature-resistant dielectric material;

FIG. 2 is a graph that illustrates the relationship between the resistivity (on a logarithmic scale) for doped and undoped lanthanum chromite compositions as a function of temperature; and FIG. 3 is a graph that illustrates the resistance of a ceramic sensor formed of $LaCrO_3$ as a function of temperature.

DETAILED DESCRIPTION OF THE INVENTION

The present invention relates to a device for monitoring temperature comprising a temperature sensing element formed of a ceramic.

One embodiment of the temperature-sensing element of the invention is formed by mounting two lead wires for electrical conduction to the ceramic.

In particular, as shown in FIGS. 1A and 1B, device 10 includes a sensing element 12 comprising a relatively dense ceramic having generally planar, opposed surfaces 14 and 16. A pair of conductive lead wires 18 and 20 are operably affixed to the opposed surfaces 14 and 16, respectively.

Each of the conductive lead wires 18 and 20 may be formed of stainless steel, nickel or nickel-chromium alloy to prevent high temperature corrosion. An electrode formed of molecular bonding silver 22, for example, can be applied to the lead wire-ceramic interface to provide adequate electrical contact.

The assembly can be covered by a temperature-resistant dielectric material 24 (as shown in FIG. 1C) so that the device is not sensitive to environmental conditions other than temperature.

The material that serves as the sensing element can be broadly classified as a ceramic. Ceramics are compounds or compound mixtures formed by firing at high temperature or by sintering particulate metal oxides in the presence of an organic binder. The mixture can include one or more metal oxides as dopants. Ceramics are usually made by batch-mixing metal oxides, and the resultant material is expressed in mole percentages of the contained elements, rather than in terms of the molecular structure on which the physical properties of the material depend.

In particular, the invention relates to a temperature-sensing device formed of a metal oxide mixture including lanthanum chromite with a dopant selected from $TiO_2$, $Al_2O_3$ and MgO. The mixture can also contain $SiO_2$ as a dopant. The sintered ceramic mixture can be represented by the formula $LaCr_{(1-x)}Me_xSi_yO_3$ wherein Me=Ti, Al or Mg $0<x\leqq 0.2$ $0\leqq y\leqq 0.2$.

The ceramic sensing element preferably includes opposed generally planar surfaces with conductive porous metal or metal oxide electrodes operably affixed thereto.

As the ambient temperature increases (or decreases), the resistivity of the temperature sensor element decreases (or increases) on a logarithmic basis. The relationship between the resistivity of the device and the temperature depends on the stoichiometry of the elements in the composition and the concentration and selection of dopants.

The ceramics of the invention can be prepared by conventional ceramic processes including ball mixing. The basic criterion for processing is the provision of the starting materials in a finely powdered state capable of being mixed and sintered to the desired physical form.

In particular, sintering is the high temperature fabrication of a product from a single phase wherein no intermediate reaction or new phase formation is required. As used herein, sintering means the thermal transformation of a porous compact comprising lanthanum chromite powder held together by an organic binder (with or without a metal oxide dopant) into a strong, relatively dense, coherent substrate.

The processing and mixing steps in the preparation of the ceramic are well-known in the art and are generally performed in a ball mill. The component metal oxide powders are intimately mixed with water in the desired proportions, and the mixture is dried after milling for an appropriate period of time. After drying, the mixture is crushed and calcined at 800°-900° C. An organic binder (with or without water) is added to the calcined powder to combine the components of the powder into a cohesive mass.

The binder selected depends on the particular application of the resistor. Examples of suitable binders include polyvinyl chloride, polystyrene, methacrylate copolymer, polyvinyl alcohol, polyvinyl butyral and the like. As described in the following Examples, polyvinyl alcohol can be used as the binder, but such use is exemplary and not limiting.

The cohesive mass is dried and granulated to form free flowing granules for pressing. After pressing to form a relatively porous compact in the configuration of a thin slab, the material is sintered at about 1300 to 1400 degrees Centigrade to provide a relatively dense ceramic.

The cohesive mass can also be tape-casted in a conventional manner onto wax paper or a glass plate and dried. The tape is then cut to form thin slabs, and the material is sintered at about 1300 to 1400 degrees Centigrade to provide a relatively dense ceramic.

Although sintering occurs in loose powders, it is greatly enhanced by compacting the powder. As a result, most commercial sintering is performed on compacted or pressed powder mixtures, which are nevertheless porous. Compacting is generally done at room temperature, and the resulting compact is subsequently sintered at a elevated temperature without the application of pressure.

The powders may be compacted at an elevated pressure and thus simultaneously pressed and sintered. This is called hot pressing or sintering under pressure, and may be used in forming the ceramic substrates of the present invention.

The sintering operation involves heating the porous compact (suspension) of the metal oxide mixture and the organic binder (where used) for a predetermined period of time at a temperature and pressure sufficient to remove the binder by pyrolysis. The time, temperature and pressure used in sintering must be sufficient to complete any chemical reactions, densify the structure, form bonds between phases and control the grain and pore sizes.

The thermodynamics of a given ceramic system can vary and should be thoroughly understood to control the manufacture of the material. The chemical composition of the powder, its particle-size distribution and its surface area are examples of important variables in the sintering process.

The porous compact or suspension can be fired in the presence or absence of air. Deairing of the suspension can minimize the porosity of the final product.

During the sintering operation, the organic binder pyrolyzes. In addition, the compacted mixture shrinks uniformly, as part of the densification process that is controlled in a manner similar to that of any other ceramic or powder metallurgical process. Specifically, the relevant parameters include particle size, amount of binder, powder characterization and heating cycles. In addition, the above-listed parameters, uniformity of heating, purity of materials and controls, and handling techniques contribute to the formation of the ceramic.

Conductive electrodes can be applied to the surface of the ceramic by any suitable method, for example, by screen printing, vapor deposition, stencil or spray methods. Preferably the electrodes are applied before the assembly is cured at high temperature.

Any metal or metal oxide that provides a continuous surface, strong adhesion to the ceramic, and has a lower electrical resistance than that of the ceramic can be used to form the electrodes. Such materials include silver (Ag), gold (Au), silver-palladium (Ag-Pd) alloys, nickel-phosphorous (Ni-P) alloys, platinum (Pt), ruthenium oxide ($RuO_2$), nickel oxide (NiO), tin oxide ($SnO_2$), indium oxide ($In_2O_3$), cadmium oxide (CdO), titanium oxide ($TiO_2$), zinc oxide (ZnO), barium titanate ($BaTiO_3$) and barium plumbate ($BaPbO_3$). Preferable metals for forming the electrodes of the present invention are silver (Ag), silver-palladium (Ag-Pd) alloys and platinum (Pt).

After the ceramic is cured for an adequate period of time, the electrode-containing ceramic is diced or cut into small sensing elements or wafers of an appropriate dimension; for example, a cube measuring about 2-5 millimeters on each side.

The following examples of preferred embodiments are given by way of illustration, but do no limit the scope of the invention.

EXAMPLE 1

A ceramic having the formula $La_{1.0}Cr_{0.90}Ti_{0.10}O_3.0.02\ SiO_2$ is prepared by mixing 1.0 mole $La_2O_3$ (technical grade, obtained from Union Carbide Corp., Danbury, CT), 0.90 moles $Cr_2O_3$ (technical grade, obtained from J. T. Baker Chemical Co., Phillipsburg, NJ) 0.10 moles $TiO_2$ (technical grade, obtained from Fisher Scientific Co., Pittsburgh, PA) and 0.02 moles $SiO_2$ (technical grade, obtained from the Alfa Division of Ventron Corp., Danvers, MA) with about 460 milliliters of water in a ball mill for about 20 hours.

The resulting aqueous slurry is dried and crushed to fine granules for calcination. The granules have a particle size that passes through a sieve of about 200 mesh. The calcination is performed at 800–900 degress Centrigrade (C.) for about 2 hours. The calcined powder is then mixed with about 3.75 grams polyvinyl alcohol and about 250 milliliters water and is ball milled for about 3 hours.

The suspension is spray-dried in a conventional manner to form free flowing granules for pressing. The suspension is formed and pressed at a pressure of about 15 to 20 tons per square inch.

Thereafter, the formed suspension or green (unsintered) body is sintered in the presence of air at about 1350 to 1400 degrees C. for 5–9 hours to form a relatively dense ceramic.

After sintering, an electrode paste, preferably formed of Ag, Ag-Pd alloy or Pt, is screen printed on both major surfaces of the ceramic, and the assembly is fired at high temperature (between about 800–1000 degrees C.) for about 10 minutes.

The electrode-containing ceramic is cut or diced to form sensing elements of the desired size; for example, 4.0×2.5×2.5 cubic millimeters.

Conductive lead wires formed of platinum or nickel-chromium alloy are bonded to the electrodes, and the assembly is coated with a dielectric material that is resistant to high temperatures, such as high temperature sealing glass (available from Electro-Science Laboratories, Inc., Pennsauken, NJ) and other conventional temperature-resistant dielectric materials.

EXAMPLE 2

A ceramic having the formula $La_{1.0}Cr_{0.97}Ti_{0.03}O_3$ is prepared by mixing and processing 1.0 mole $La_2O_3$, 0.97 moles $Cr_2O_3$ and 0.03 moles $TiO_2$ (all technical grade, obtained from the above listed suppliers) as described in Example 1.

EXAMPLE 3

A ceramic having the formula $La_{1.0}Cr_{0.925}Mg_{0.50}Al_{0.25}O_3$ is prepared by mixing and processing 1.0 mole $La_2O_3$, 0.925 moles $Cr_2O_3$, 0.50 moles MgO (technical grade, obtained from J. T. Baker Chemical Co., Phillipsburg, NJ), and 0.25 moles $Al_2O_3$ (technical grade, obtained from J. T. Baker Chemical Co.) as described in Example 1. The $La_2O_3$ and $Cr_2O_3$ are obtained as technical grade materials from the suppliers listed in Example 1.

EXAMPLE 4

A ceramic having the formula $La_{1.0}Cr_{0.95}Mg_{0.50}O_3$ is prepared by mixing and processing 1.0 mole $La_2O_3$, 0.95 moles $Cr_2O_3$ and 0.50 moles MgO (all technical grade, obtained from the suppliers listed in the foregoing Examples) as described in Example 1.

FIG. 2 shows the relationship of resistivity on a logarithmic basis versus temperature for the ceramics of Examples 1 through 4.

In each instance, the ceramic, when formed into a sensing element according to the process described in Example 1, produces a characteristic relationship of resistivity (on a logarithmic basis) versus temperature.

FIG. 3 shows the relationship of resistance on a logarithmic basis versus temperature for a ceramic formed of lanthanum chromite.

In alternative embodiments of the foregoing Examples, various combinations of MgO, $Al_2O_3$ and $TiO_2$ can be used as dopants provided the mole percentage of magnesium, aluminum and titanium in the resulting ceramic is greater than zero but less than or equal to 0.2 mole percent. In addition, up to 0.02 mole percent of $SiO_2$ can be added as a dopant.

In each instance, the resistivity of the ceramic changes as a function of temperature. The shape of the curve depends on the particular composition of the ceramic.

While the present invention as been described with reference to the particular embodiments, it will be understood that various changes and modifications may be made without departing from the spirit of the invention.

What is claimed is:

1. A device suitable for monitoring temperature comprising a ceramic sensing element having opposed, generally planar surfaces and electrical leads operably associated with the opposed surfaces, said ceramic having a composition represented by the formula:

$$LaCr_{(1-x)}Me_xSi_yO_3$$

wherein

Me=Mg, Al or Ti;

$0<x\leqq 0.2$
$0\leqq y\leqq 0.2$.

2. The device according to claim 1 wherein said ceramic includes a dopant selected from MgO, $Al_2O_3$ and $TiO_2$.

3. The device according to claim 2 wherein said ceramic further includes less than about 0.2 mole percent $SiO_2$.

4. The device according to claim 1 wherein each opposed surface of the sensing element includes an electrode formed of a material selected from the group consisting of Ag, Au, Ag-Pd alloy, Ni-P alloy, Pt, $RuO_2$, NiO, $SnO_2$, $In_2O_3$, $TiO_2$, ZnO, $BaTiO_3$ and $BaPbO_3$.

5. The device according to claim 1 wherein each opposed surface of the sensing element includes an electrode formed of a material selected from the group consisting of Ag, Ag-Pd alloys and Pt.

6. The device according to claim 1 wherein the resistivity of said sensing element decreases on a logarithmic basis as the temperature increases.

7. The device according to claim 1 wherein the resistivity of said sensing element increases on a logarithmic basis as the temperature decreases.

8. The device according to claim 1 wherein the device is suitable for monitoring temperatures from ambient room temperature to about 800 degrees C.

9. A ceramic represented by the formula:

$$LaCr_{(1-x)}Me_xSi_yO_3$$

wherein
Me=Mg, Al or Ti; and
$0<x\leqq 0.2$
$0\leqq y\leqq 0.2$.

10. A sensing element for monitoring temperature as a function of electrical resistivity comprising a ceramic having electrodes operably affixed thereon and being represented by the formula:

$$LaCr_{(1-x)}Me_xSi_yO_3$$

wherein
Me=Mg, Al or Ti; and
$0<x\leqq 0.2$
$0\leqq y\leqq 0.2$
the resistivity of said sensing element changing as a function of temperature.

11. The sensing element according to claim 10 wherein each electrode is formed of a material selected from the group consisting of Ag, Au, Ag-Pd alloy, Ni-P alloy, Pt, $RuO_2$, NiO, $SnO_2$, $In_2O_3$, $TiO_2$, ZnO, $BaTiO_3$ and $BaPbO_3$.

12. The sensing element according to claim 10 wherein each electrode is formed of a material selected from the group consisting of Ag, Ag-Pd alloy and Pt.

13. The sensing element according to claim 10 wherein the resistivity of said ceramic decreases on a logarithmic basis as the temperature increases.

14. The sensing element according to claim 10 wherein the sensitivity of said ceramic increases on a logarithmic basis as the temperature decreases.

15. The sensing element according to claim 10 wherein the sensing element is suitable for monitoring temperatures from ambient room temperature to about 800 degrees C.

16. A device suitable for monitoring temperature comprising:

(a) a ceramic sensing element having opposed, generally planar surfaces;
(b) electrical leads operably associated with opposed surfaces of the sensing element; and
(c) a dielectric material covering the sensing element, said ceramic having a composition represented by the formula:

$$LaCr_{(1-x)}Me_xSi_yO_3$$

wherein
Me=Mg, Al or Ti;
$0<x\leqq 0.2$
$0\leqq y\leqq 0.2$.

17. The device according to claim 16 wherein said ceramic includes a dopant selected from MgO, $Al_2O_3$ and $TiO_2$.

18. The device according to claim 17 wherein said ceramic further includes less than about 0.2 mole percent $SiO_2$.

19. The device according to claim 16 wherein each opposed surface of the sensing element includes an electrode formed of a material selected from the group consisting of Ag, Au, Ag-Pd alloy, Ni-P alloy, Pt, $RuO_2$, NiO, $SnO_2$, $In_2O_3$, $TiO_2$, ZnO, $BaTiO_3$ and $BaPbO_3$.

20. The device according to claim 16 wherein each opposed surface of the sensing element includes an electrode formed of a material selected from the group consisting of Ag, Ag-Pd alloys and Pt.

21. The device according to claim 16 wherein the resistivity of said sensing element decreases on a logarithmic basis as the temperature increases.

22. The device according to claim 16 wherein the resistivity of said sensing element increases on a logarithmic basis as the temperature decreases.

23. The device according to claim 16 wherein the device is suitable for monitoring temperatures from ambient room temperatures to about 800 degrees C.

* * * * *